United States Patent [19]
Lee

[11] Patent Number: 5,585,981
[45] Date of Patent: Dec. 17, 1996

[54] METHOD AND DEVICE FOR FASTENING A VOICE COIL MOTOR OF A HARD DISK DRIVE

[75] Inventor: Joo-Shik Lee, Seoul, Rep. of Korea

[73] Assignee: SamSung Electronics Co., Ltd., Kyungki-do, Rep. of Korea

[21] Appl. No.: 498,462

[22] Filed: Jul. 5, 1995

[30] Foreign Application Priority Data

Jul. 7, 1994 [KR] Rep. of Korea ................. 16323/1994

[51] Int. Cl.⁶ ....................................................... G11B 5/55
[52] U.S. Cl. ....................................................... 360/106
[58] Field of Search ............................................ 360/106

[56] References Cited

U.S. PATENT DOCUMENTS

| | | |
|---|---|---|
| 4,658,313 | 4/1987 | Takahashi et al. . |
| 4,700,246 | 10/1987 | Luoma et al. . |
| 4,707,754 | 11/1987 | Patel . |
| 4,819,110 | 4/1989 | Funai et al. . |
| 4,835,643 | 5/1989 | Schulze . |
| 4,965,684 | 10/1990 | Stefansky . |
| 5,270,887 | 12/1993 | Edwards ................. 360/106 |
| 5,295,031 | 3/1994 | Wasson . |
| 5,315,467 | 5/1994 | Yoshida ................. 360/106 |
| 5,483,400 | 1/1996 | Tsujino ................. 360/106 |

*Primary Examiner*—A. J. Heinz
*Attorney, Agent, or Firm*—Robert E. Bushnell, Esq.

[57] ABSTRACT

A device and method for fastening a voice coil motor of a hard disk drive reduces the space occupied when the voice coil motor is fastened to the hard disk drive. The device is characterized by fastening a bottom plate to a base with an adhesive material, setting the bottom plate to a bottom magnet with the adhesive material, placing a top plate adjacent to the outside edges of the bottom plate, placing a top magnet to a lower side of the top plate with the adhesive material, placing a bobbin of an actuator between the bottom magnet and the top magnet by keeping a given distance, and fastening a cover to an upper side of the top plate with the adhesive material.

7 Claims, 3 Drawing Sheets

METHOD AND DEVICE FOR FASTENING A VOICE COIL MOTOR OF A HARD DISK DRIVE

CROSS-REFERENCE TO RELATED APPLICATIONS

This application makes reference to, incorporates the same herein, and claims all benefits accruing under 35 U.S.C. §119 from an application for *Method And Device For Fastening A Voice Coil Motor Of A Hard Disk Drive* filed in the Korean Industrial Property Office on 7 Jul. 1994 and assigned Ser. No. 16323/1994.

BACKGROUND OF THE INVENTION

The present invention relates to a voice coil motor of a hard disk drive, and more particularly to a method and device for fastening the voice coil motor of a hard disk drive to reduce the amount of space occupied in the hard disk drive.

A term known as "stress concentration" is defined as a phenomena where a disturbance, such as an external force, occurs in a structure and stress increases in a portion of a structure member where a rapid variation of shape exists.

A hard disk drive used as an auxiliary computer memory is an article manufactured with a high degree of precision. That is, the hard disk drive is assembled in an environment where the air cleaning class is less than 100. The hard disk drive utilizes a flying head maintained at an extremely low flying height (typically, less than $4 \times 10^{-6}$ inches) over a recording media rotated at a high speed so as to record and play back information. Accordingly, a scratch in the recording media or a crash between the head and the recording media can result from even an extremely small amount of dust. This can result in data loss or can cause data recording and playback to become impossible, which is one flaw in the manufactured article.

Accordingly, in the process of assembling the hard disk drive, a primary cleaning should be performed before assembling mechanical parts of the hard disk drive. Also, with semi-assembled products, a re-cleaning should be performed before final assembly is executed. In order to minimize the presence of dust in the assembly process, a fastener or screw used at junctions between the mechanical parts is composed of stainless steel. Dust resulting from metallic abrasion when the screw is assembled can be removed by using an air cleaner. Also, if necessary, dust can be wiped away by a cotton swab with cleanser. Accordingly, a considerable amount of attention is paid in the process of assembling the hard disk drive.

In cases where dust is already present, it is possible to locate and remove dust which is visible to the naked eye. However, due to the influence of static electricity, it is difficult and nearly impossible to remove dust that is invisible to the naked eye, even if the dust is blown away with the air cleaner. When dust is present after the head and recording media are assembled, such dust can pollute the operational integrity of the head and recording media. Therefore, close attention must be paid in the assembly process.

An optimal method of assembly would not produce any dust. Such a result, however, is difficult to obtain when the mechanical components are assembled using screws. Accordingly, efforts for changing designs to eliminate the use of screws are being pursued. One example includes assembling a voice coil motor magnet to a plate by using an adhesive material. The conventional assembly methods typically utilize fasteners, such as screws, to enable the completed product to be disassembled and re-assembled when so required. It is anticipated, however, that the present tendency in the industry is to merely disregard defective products, rather than rework them. In such cases, even though electromechanical components are assembled using adhesive material, there is a great advantage over the conventional art. This is especially true when problems with adhesive material involving gas occurrences, connecting strength and solidifying speed, are solved.

SUMMARY OF THE INVENTION

Accordingly, it is an object of the present invention to provide an improved voice coil motor fastening device for a hard disk drive.

It is another object to provide a voice coil motor fastening device for a hard disk drive that conserves space within the hard disk drive.

It is still another object to provide a voice coil motor fastening device for a hard disk drive that reduces the presence of dust.

It is yet another object to provide a voice coil motor fastening device that eliminates the need for conventional fastening means.

It is still yet another object to provide a voice coil motor fastening device in which a bottom plate is assembled to a base with an adhesive material.

These and other objects can be achieved in accordance with the principles of the present invention by using an adhesive material to connect a top plate to a cover and a bottom plate to a base, by using an insert molding method or by using a magnetic force between a bottom magnet and the bottom plate, and by sealing the resulting product.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

In the following detailed description, many specific details are set forth to provide a more thorough understanding of the present invention. It will be apparent, however, to those skilled in the art, that the present invention may be practiced without these specific details. In other instances, well known circuits have not been described so as not to obscure the present invention.

DETAILED DESCRIPTION OF THE PREFERRED EMBODIMENTS

Figure 1:
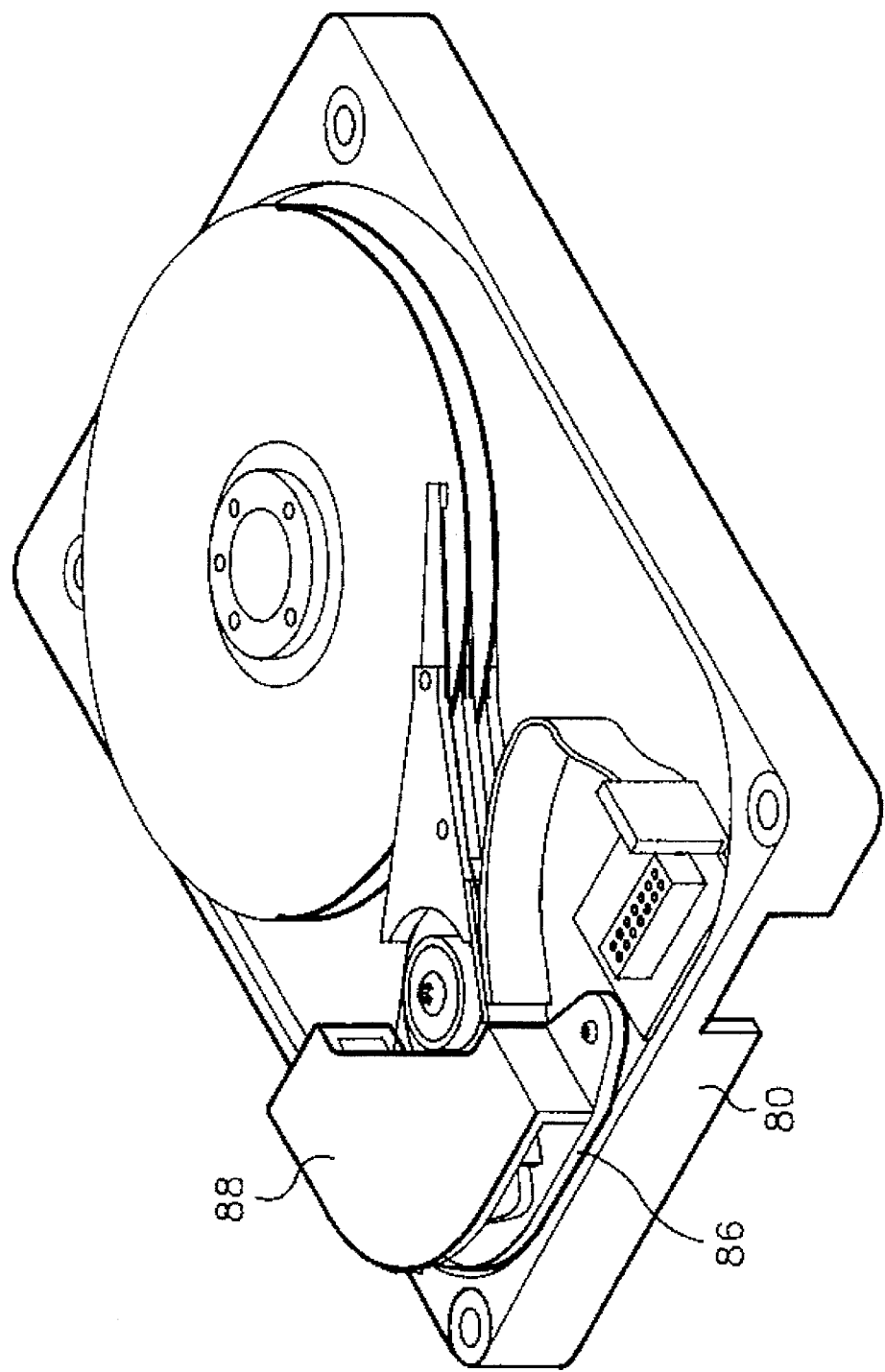
FIG. 1 is a perspective view showing a voice coil motor attached to a hard disk drive.
Figure 2:
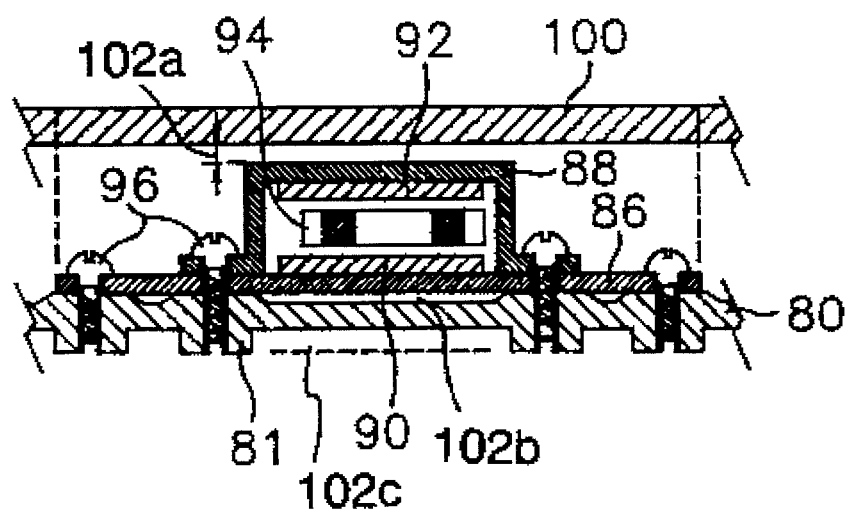
FIG. 2 is a sectional view showing major components of a voice coil motor fastening device of FIG. 1.

Referring to FIGS. 1 and 2, a voice coil motor fastening device in a hard disk drive will now be described. A bottom magnet 90 of a voice coil motor (VCM) is connected to a bottom plate 86 with an adhesive material. Bottom plate 86 is connected to a base 80 with screws 96. An actuator is assembled so that a coil and bobbin of a voice coil motor 94 positioned on a first end of the actuator are placed over bottom magnet 90. A top magnet 92 is connected to a top plate 88 with adhesive material, and the coil and bobbin of voice coil motor 94 are covered by top plate 88. Assembly of the voice coil motor is completed by screws 96, and other components to be connected to base 80 can then be assembled. A cover 100 is connected to base 80, and a driving system including the head and recording media of the hard disk drive is sealed.

In constructing the device described above, the area taken up by the voice coil motor includes: an area occupied by screws 96 for connecting top plate 88 to bottom plate 86, an area occupied by a gap 102a provided as an assembly allowance between cover 100 and top plate 88, and an area occupied by a gap 102c formed by the height of a boss 81 (as shown by the segmented line in FIG. 2) for providing a screw slot on base 80. Furthermore, variations between connected components are caused by using the screw assembly, and a loss of product reliability results from the influence of the stress concentration and from the presence of dust in the assembly. Structural strength in the assembly is reduced by gap 102b between base 80 and bottom plate 86, and by a loosening of the connection between bottom plate 86 and top plate 88. Accordingly, a servo performance margin is lost when breakage occurs or when external vibrations are applied. Also, since the mass of the assembly is concentrated on the circumference of the voice coil motor, mass distribution in the hard disk drive is unequal, and variations in the operation of the hard disk drive are caused from breakage or from the application of external vibrations.

Referring now to FIGS. 3 through 6, the preferred embodiments of the present invention will be described in detail.

Figure 3:
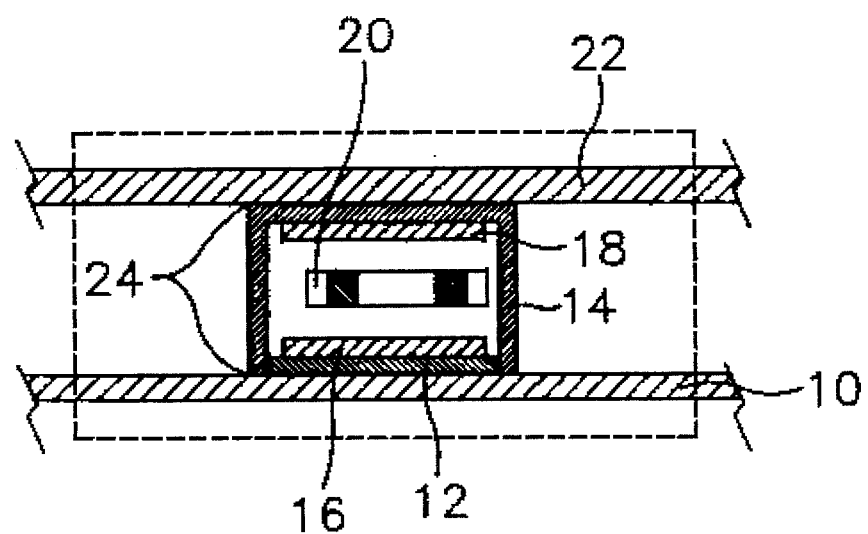
FIG. 3 is a sectional view showing the major components of a first embodiment of a voice coil motor fastening device constructed according to the principles of the present invention.

FIG. 3 is a sectional view showing the major components of a first embodiment of a voice coil motor fastening device constructed according to the principles of the present invention. In FIG. 3, top and bottom plates are respectively connected to a cover and a base with an adhesive material.

In the first embodiment of the present invention, a device for affixing a voice coil motor of a hard disk drive to a base 10 and to a cover 22 with an adhesive material 24 is depicted. A bottom plate 12 is connected to base 10 with adhesive material 24 and a bottom magnet 16 is joined to bottom plate 12 by adhesive material 24. A lower side of a top plate 14 is joined to a top magnet 18 by adhesive material 24. A bobbin and coil of a voice coil motor 20 are placed between bottom magnet 16 and top magnet 18 and maintain a given distance between the two magnets. An upper side of top plate 14 is fastened to cover 22 with adhesive material 24. The adhesive material used in the embodiments of the present invention can be an anaerobic adhesive material which is solidified by ultraviolet rays.

In the first embodiment of the present invention, cover 22 and base 10 are connected to top plate 14 and to bottom plate 12 by adhesive material 24. In contrast to the conventional art described above, the first embodiment of the present invention avoids the necessity of a fastener, the boss for affixing the fastener, and the gap between the top plate and cover by considering assembly allowances among the respective mechanical components. Accordingly, the space occupied in the hard disk drive is reduced as shown by the hidden lines in FIGS. 2 and 3. Also, the present invention has the effect of reducing the presence of dust attributable to abrasions from the screw during the assembly of the top plate and cover and during the assembly of the bottom plate and base.

Figure 4:
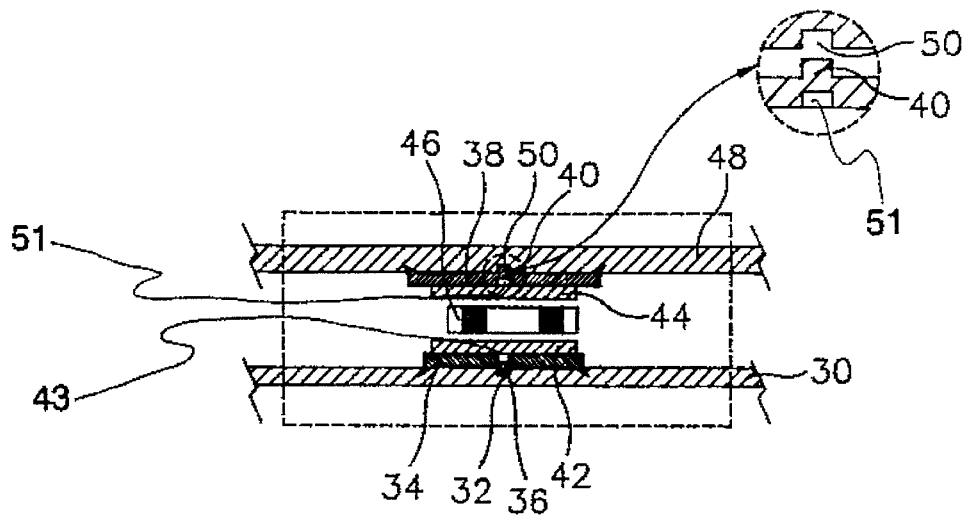
FIG. 4 is a sectional view showing the major components of a second embodiment of a voice coil motor fastening device constructed according to the principles of the present invention.

Referring now to FIG. 4, a sectional view of the major components of a second embodiment of a voice coil motor fastening device constructed according to the principles of the present invention is illustrated. FIG. 4 shows a top plate 38 connected to a cover 48 via a projection 40 and a slot 50, and a bottom plate 34 connected to a base 30 via a projection 36 and a slot 32. Slot 32 has a predetermined size and is formed as a recess in base 30 for connecting bottom plate 34 to base 30. Bottom plate 34 includes projection 36 which is inserted into slot 32 in base 30. Projection 36 has a predetermined size to conform to slot 32 and extends downwardly in a perpendicular manner from bottom plate 34. Top plate 38 includes projection 40 for connecting cover 48 and top plate 38. Projection 40 has a predetermined size to conform to slot 50 and extends upwardly in a perpendicular manner from top plate 38. Slot 50 has a predetermined size and is formed as a recess in cover 48 to accommodate insertion of projection 40, and thereby facilitate the connection between cover 48 and top plate 38. Top and bottom plates 38 and 34 are connected to a top magnet 44 and a bottom magnet 42, respectively. A bobbin and coil of a voice coil motor 46 are positioned between top magnet 44 and bottom magnet 42 and maintain a given distance between the two magnets.

In contrast to the conventional art described above, the second embodiment of the present invention also avoids the necessity for the fastener, the boss for affixing the fastener, and the gap between the top plate and cover by considering assembly allowances among the respective mechanical components. Accordingly, the space occupied in the hard disk drive is reduced as shown by the hidden lines in FIGS. 2 and 3. Also, the second embodiment of the present invention has the effect of reducing the presence of dust attributable to abrasions from the screw during the assembly of the top plate and cover and during the assembly of the bottom plate and base. That is, the dust problem associated with the conventional art does not occur in the present invention.

With the second embodiment, the method for fastening the voice coil motor of the hard disk drive to base 30 is as follows. First, bottom plate 34 for shielding magnetic fields is connected to base 30. To enable this connection, bottom plate 34 is placed into the interior of a pre-formed mold to construct base 30. Cavity 43 in bottom plate 34 is positioned over a protrusion in the mold to keep the bottom plate in a desired position in the mold. Melted material is then poured into a cavity of the mold, over projection 36 and over bottom plate 34 to form base 30. Cavity 43 holds the bottom plate 34 in position and prevents bottom plate 34 from shifting during the pouring of the melted material and while the melted material hardens to form base 30. The hardening of base 30 will join the base 30 to bottom plate 34.

Top plate 38 is connected to cover 48 of the voice coil motor of the hard disk drive for shielding magnetic fields. To enable this connection, top plate 38 is placed into the interior of a pre-formed mold to construct cover 48. Cavity 51 in top plate 38 is positioned over a protrusion in the mold to keep the top plate 38 in a desired position. Melted material is then poured into a cavity of the mold, over projection 40 and over top plate 38 to form cover 48. Accordingly, the insert molding method can be used for the connections. Cavity 51 holds top plate 38 in position and prevents top plate 38 from shifting during the pouring of the melted material and while the melted material hardens to form cover 48. The hardening of cover 48 will join the cover 48 to top plate 38.

Figure 5:
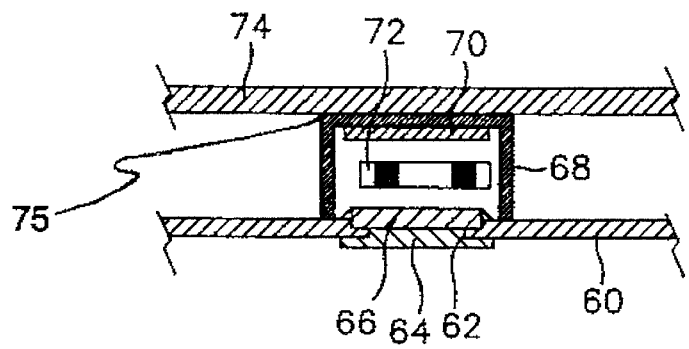
FIG. 5 is a sectional view showing the major components of a third embodiment of a voice coil motor fastening device constructed according to the principles of the present invention.

Referring now to FIG. 5, a sectional view of the major components of a third embodiment of a voice coil motor fastening device constructed according to the principles of the present invention is shown. In FIG. 5, a top plate 68 is connected to a cover 74 with adhesive material 75, and a bottom plate 64 typically formed from a C1010 material widely used in hard disk drives is connected to a base 60 by the magnetic force of a bottom magnet 66. The third embodiment of the present invention is a device for affixing components of the voice coil motor of the hard disk drive to base 60 via the magnetic force of bottom magnet 66 and to cover 74 with adhesive material 75. The device is then sealed. Base 60 is provided with a step-shaped opening 62 for assembling bottom magnet 66 and bottom plate 64. An upper part of opening 62 is assembled by insertion of bottom magnet 66, and then is sealed. Bottom plate 64 is placed on the lower side of bottom magnet 66 by the magnetic force of bottom magnet 66. Top plate 68 is set adjacent outside edges of bottom magnet 66. Top magnet 70 is adhered to a lower side of top plate 68. A bobbin and coil of a voice coil motor 72 are placed between top magnet 70 and bottom magnet 66 and maintain a given distance between the two magnets.

In contrast to the conventional art described above, the third embodiment of the present invention also avoids the necessity for the fastener, the boss for affixing the fastener, and the gap between the top plate and cover by considering assembly allowances among the respective mechanical components. Accordingly, the space occupied in the hard disk drive is reduced as shown by the hidden lines in FIGS. 2 and 3. Also, the third embodiment of the present invention has the effect of reducing the presence of dust attributable to abrasions from the screw during the assembly of the top plate and cover and during the assembly of the bottom plate and base. That is, the dust problem associated with the conventional art does not occur in the present invention.

Figure 6:
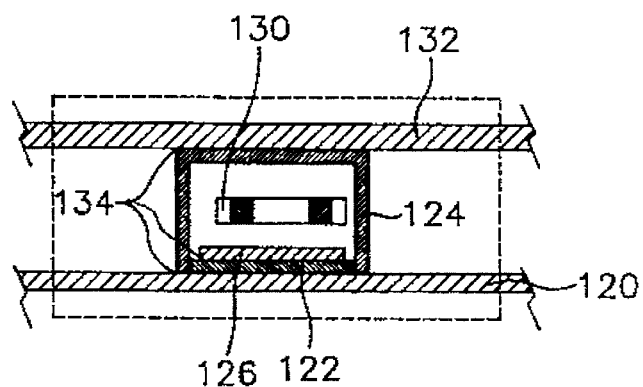
FIG. 6 is a sectional view showing the major components of a fourth embodiment of a voice coil motor fastening device constructed according to the principles of the present invention.

Referring now to FIG. 6, a sectional view of the major components of a fourth embodiment of a voice coil motor fastening device constructed according to the principles of the present invention is shown. As shown in FIG. 6, the fourth embodiment of the present invention uses only one magnet 126 in the construction of the voice coil motor of the hard disk drive. A bottom plate 122 formed from a magnetic material for shielding magnetic fields is connected to a base 120 with an adhesive material 134 to form the groundwork of the hard disk drive. Magnet 126 is connected to bottom plate 122 with adhesive material 134. A top plate 124 formed from a magnetic material is placed adjacent to the outside edges of bottom plate 122. A bobbin and coil of a voice coil motor 130 are placed between magnet 126 and top plate 124 and maintain a given distance between the magnet 126 and top plate 124. A cover 132 is connected to an upper side of top plate 124 by adhesive material 134.

The fourth embodiment of the present invention does not utilize two magnets, but uses only one magnet on one side in the voice coil motor of the hard disk drive. Top plate 124 creates a path of magnetic flux. In the fourth embodiment of the present invention as described above, since the number magnets is reduced, there is an advantage in that the packaging density of the product is increased by reducing the space occupied by magnets.

In the embodiments of the present invention described above, the bottom plate is connected to the base or the cover is connected to the top plate by adhesive material or by the insert molding method in the voice coil motor of the hard disk drive. Accordingly, there is the advantage of increasing packaging density with a simplified device.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A device for fastening a voice coil motor in a hard disk drive, said device comprising:

a base for supporting components of said hard disk drive;

a bottom magnet;

a bottom plate having a bottom surface fastened to said base with an adhesive material and having a top surface fastened to said bottom magnet with said adhesive material;

a top magnet;

a top plate having first and second ends positioned to join first and second ends of said bottom plate, respectively, said top plate having a lower surface fastened to said top magnet with said adhesive material;

a bobbin of said voice coil motor positioned and maintaining a given distance between said bottom magnet and said top magnet; and a cover for covering said components of said hard disk drive, said cover being fastened to a top surface of said top plate with said adhesive material.

2. The device as claimed in claim 1, wherein said adhesive material is an anaerobic adhesive material solidified by ultraviolet rays.

3. A device for fastening a voice coil motor in a hard disk drive, said device comprising:

a cover for covering components of said hard disk drive;

a base for supporting said components of said hard disk drive;

a bottom plate;

a first slot having a predetermined size and formed in said base for fastening said bottom plate to said base;

a first projection extending perpendicularly downward from a bottom surface of said bottom plate and inserted into said first slot in said base for fastening said base to said bottom plate, said first projection having a size to conform to said predetermined size of said first slot;

a top plate;

a second slot having a predetermined size and formed in said cover for fastening said top plate to said cover;

a second projection extending perpendicularly upward from a top surface of said top plate and inserted into said second slot in said cover for fastening said cover to said top plate, said second projection having a size to conform to said predetermined size of said second slot;

a bottom magnet connected to a top surface of said bottom plate;

a top magnet connected to a bottom surface of said top plate; and a bobbin of said voice coil motor positioned and maintaining a given distance between said top magnet and said bottom magnet.

4. A method for fastening a bottom plate of a voice coil motor to a base in a hard disk drive, said method comprising the steps of:

placing said bottom plate within a pre-formed mold of said base; and pouring melted material into a cavity of said mold and over said bottom plate to form said base and to fasten said bottom plate to said base during formation of said base.

5. A method for fastening a top plate of a voice coil motor to a cover in a hard disk drive, said method comprising the steps of:

placing said top plate within a pre-formed mold of said cover; and pouring melted material into a cavity of said mold and over said top plate to form said cover and to fasten said top plate to said cover during formation of said cover.

6. A device for fastening a voice coil motor of a hard disk drive, said device comprising:

a base for supporting components of said hard disk drive;

a cover for covering said components of said hard disk drive;

a bottom magnet;

a bottom plate;

an opening having upper and lower portions and formed in said base to accommodate a connection between said bottom magnet and said bottom plate;

said bottom magnet being positioned within said upper portion of said opening to magnetically engage and retain an upper surface of said bottom plate, said bottom plate being positioned within said lower portion of said opening to magnetically engage and retain a lower surface of said bottom magnet;

a top plate having first and second ends positioned adjacent to first and second ends of said bottom magnet, respectively, said top plate having a top surface connected to a lower surface of said cover with an adhesive material;

a top magnet connected to a lower surface of said top plate; and a bobbin of said voice coil motor positioned and maintaining a given distance between said top magnet and said bottom magnet.

7. A device for fastening a voice coil motor of a hard disk drive, said device comprising:

a base for supporting components of said hard disk drive;

a magnet;

a bottom plate having a lower surface fastened to said base with an adhesive material and having an upper surface fastened to said magnet with said adhesive material;

a top plate having first and second ends positioned to respectively join first and second ends of said bottom plate;

a bobbin of said voice coil motor positioned and maintaining a given distance between said magnet and said top plate; and a cover for covering said components of said hard disk drive, said cover being fastened on an upper surface of said top plate with said adhesive material.

* * * * *